(12) United States Patent
Sasaki et al.

(10) Patent No.: US 9,195,735 B2
(45) Date of Patent: Nov. 24, 2015

(54) INFORMATION EXTRACTING SERVER, INFORMATION EXTRACTING CLIENT, INFORMATION EXTRACTING METHOD, AND INFORMATION EXTRACTING PROGRAM

(71) Applicant: Kabushiki Kaisha Toshiba, Minato-ku (JP)

(72) Inventors: Kenta Sasaki, Tokyo (JP); Shinichi Nagano, Kanagawa (JP); Koji Ueno, Shizuoka (JP); Kenta Cho, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 175 days.

(21) Appl. No.: 14/138,759

(22) Filed: Dec. 23, 2013

(65) Prior Publication Data

US 2014/0188883 A1     Jul. 3, 2014

(30) Foreign Application Priority Data

Dec. 28, 2012   (JP) .................................. 2012-287137

(51) Int. Cl.
*G06F 17/00* (2006.01)
*G06F 17/30* (2006.01)

(52) U.S. Cl.
CPC ................................ *G06F 17/30598* (2013.01)

(58) Field of Classification Search
CPC ............ G06F 17/2872; G06F 17/3061; G06F 17/30669; G06F 17/2785; G06F 17/2235; G06F 17/2241; G06F 17/279; G06F 17/2809; G06F 17/30719; G06F 17/30855; G06F 17/30861; G06F 17/30864; G06F 17/30879
See application file for complete search history.

(56) References Cited

U.S. PATENT DOCUMENTS

2012/0271589 A1    10/2012  Nagano et al.

FOREIGN PATENT DOCUMENTS

| JP | 2001-188987 | 7/2001 |
| JP | 2009-157764 | 7/2009 |
| JP | 2010-20731 | 1/2010 |
| JP | 2010-128898 | 6/2010 |
| WO | WO 2011/036754 | 3/2011 |

*Primary Examiner* — Truong Vo
(74) *Attorney, Agent, or Firm* — Oblon, McClelland, Maier & Neustadt, L.L.P.

(57) ABSTRACT

According to one embodiment, an information extracting method includes: collecting a text in which a keyword of interest appears, the keyword of interest, and a time of creation of the text; extracting a keyword included in the text except for the keyword of interest and configured to extract the time of creation; extracting the keyword having a time score obtained on the basis of an appearance frequency of the keyword in a time interval exceeding a first threshold value and a local score obtained from the appearance frequency of the keyword in a predetermined local area exceeding a second threshold value as a local hot word, and also extract the extracted time interval of the extracted keyword and the keyword of interest corresponding to the keyword; and storing the extracted local hot word, the time interval, and the keyword of interest.

17 Claims, 14 Drawing Sheets

Fig. 2

| TEXT | TIME OF CREATION | LOCATION INFORMATION |
|---|---|---|
| THE BEATLES POSTER AT SHIBUYA STATION IS GOOD! | DEC. 11ST, 2011 10:00 | SHIBUYA STATION |
| THE BEATLES POSTER OF PAUL MCCARTNEY@SHIBUHA STATION | DEC. 11ST, 2011 17:00 | SHIBUYA STATION |
| SHOP OF CONCOURSE AT SHINAGAWA STATION HAS CHANGED | DEC. 11ST, 2011 11:00 | SHINAGAWA STATION |
| CONCOURSE HAS RENEWED, SHINAGAWA STATION | DEC. 11ST, 2011 16:30 | SHINAGAWA STATION |

Fig. 4

| LOCAL HOT WORD | TIME INTRVAL | LOCATION INFORMATION |
|---|---|---|
| THE BEATLES POSTER | DEC. 11ST, 2011 00:00-23:59 | SHIBUYA STATION |
| TRAFFIC SIGNAL DISORDER | DEC. 12ND, 2011 00:00-23:59 | SHIBUYA STATION |
| CONCOURSE | DEC. 11ST, 2011 00:00-23:59 | SHINAGAWA STATION |
| CROWDED | DEC. 12ND, 2011 00:00-23:59 | SHINAGAWA STATION |

Fig. 5

| CATEGORY | LOCATION INFORMATION |
|---|---|
| EAST LOOP LINE | SHIBUYA STATION |
| EAST LOOP LINE | SHINAGAWA STATION |
| WEST LOOP LINE | OSAKA STATION |
| WEST LOOP LINE | KYOBASHI STATION |

Fig. 6

| USER TEXT | TIME OF CREATION BY USER | LOCATION INFORMATION |
|---|---|---|
| CONCOURSE IS RENEWED | DEC. 11ST, 2011 12:00 | SHINAGAWA STATION |
| THE BEATLES POSTER IS VIGOROUS | DEC. 11ST, 2011 13:00 | SHIBUYA STATION |

FIG. 7

- THE BEATLES POSTER IS VIGOROUS
  #ShibuyaStation

- CONCOURSE IS RENEWED
  #ShinagawaStation

Fig. 14

| CATEGORY | TV PROGRAM INFORMATION |
|---|---|
| TOKYO AREA BROADCASTING | DRAMA C |
| KANTO AREA BROADCASTING | NEWS D |
| CAPITAL AREA BROADCASTING | POPULAR MUSIC SHOW E |
| TOKYO BAY BROADCASTING | VARIETY F |

INFORMATION EXTRACTING SERVER, INFORMATION EXTRACTING CLIENT, INFORMATION EXTRACTING METHOD, AND INFORMATION EXTRACTING PROGRAM

CROSS-REFERENCE TO RELATED APPLICATIONS

This application is based upon and claims the benefit of priority from the prior Japanese Patent Application No. 2012-287137, filed on Dec. 28, 2012; the entire contents of which are incorporated herein by reference.

FIELD

Embodiments described herein relate generally to an information extracting server, an information extracting client, an information extracting method, and an information extracting program configured to estimate information of interest.

BACKGROUND

In mobile terminals having a GPS mounted thereon, the GPS is not necessarily active all the time, and hence there is a case where location information is recorded only partly. Mobile terminals that have no GPS mounted thereon also exist. Therefore, a technology that estimates the location information from a text input in the mobile terminal is proposed. This technology maps location information on a map as accurate as possible from a sentence which includes ambiguous location information such as "in the proximity of Kamakura and Enoshima".

However, the related art as described above is based on the premise that location keywords such as "Kamakura" and "Enoshima" appear in the text, and cannot specify the location with the text including no location keyword appearing therein. Not only the location keyword, in the case of a text in which no keyword interested by a user such as a keyword relating to a TV program appears, the keyword of interest cannot be specified.

Therefore, the user cannot search or sort out the text by using keyword of interest on the mobile terminal.

In the server that controls the text, since the keyword of interest is not specified, the text cannot be sort out on the basis of the keyword of interest.

The embodiments disclosed herein are intended to provide an information extracting server, an information extracting client, an information extracting method, and an information extracting program configured to be capable of extracting information of interest to a user from a text.

BRIEF DESCRIPTION OF THE DRAWINGS

FIG. 2 is a drawing illustrating data of a text storing unit;
FIG. 4 is a drawing illustrating data of a local hot word storing unit;
FIG. 5 is a drawing illustrating data of a category storing unit;
FIG. 6 is a drawing illustrating data of a user storing unit;
FIG. 7 is an example of a UI to be displayed to a client;
FIG. 14 is a drawing illustrating data of a user storing unit of Embodiment 4.

DETAILED DESCRIPTION

Figure 1:
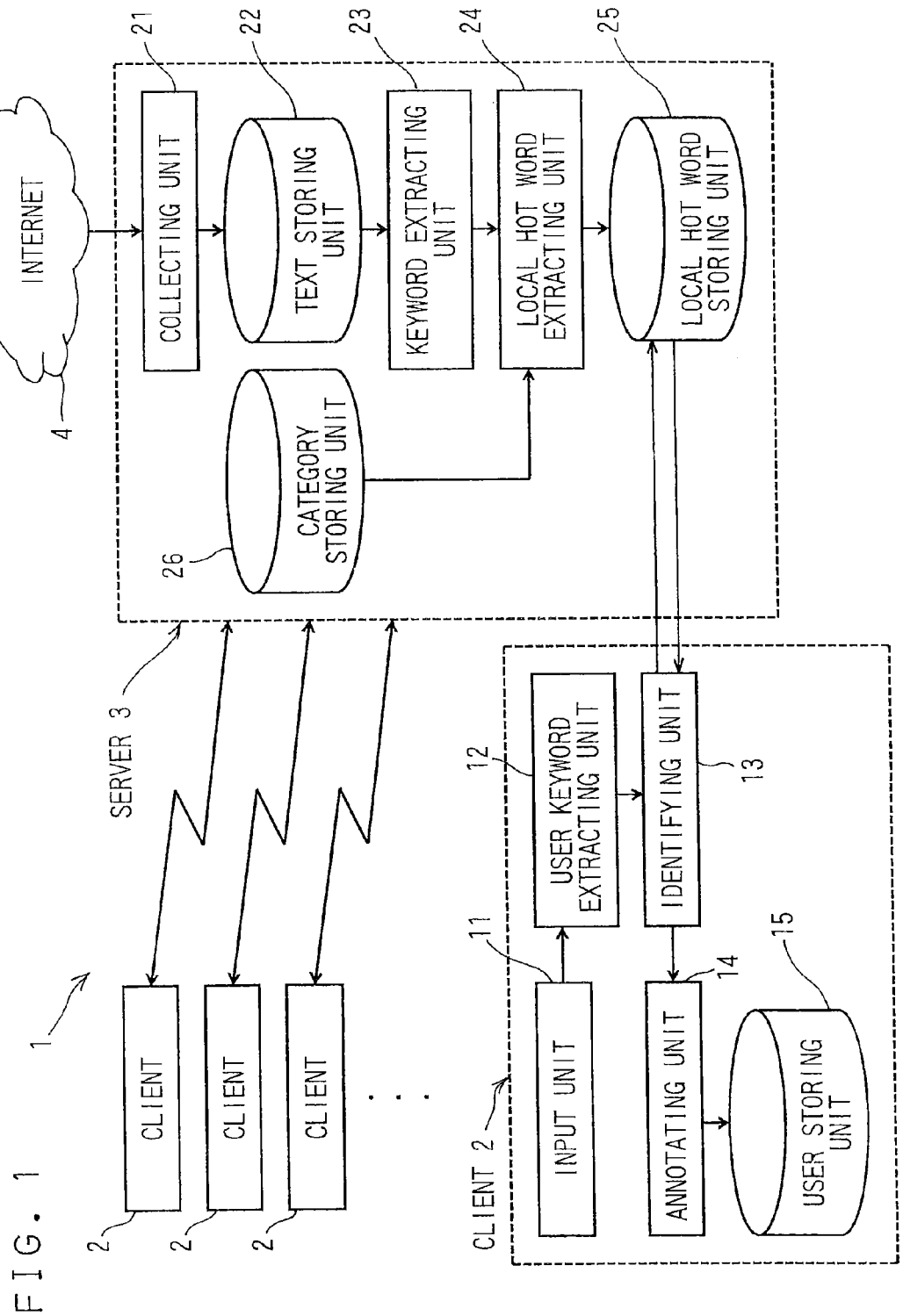
FIG. 1 is a block diagram of an information extracting system of Embodiment 1.

According to embodiments, an information extracting server includes: a collecting unit configured to collect a text in which a keyword of interest indicating information of interest that a user is interested in appears, the keyword of interest, and a time of creation of the text; a keyword extracting unit configured to extract a keyword included in the text except for the keyword of interest, and the time of creation; a local hot word extracting unit configured to extract the keyword having a time score obtained on the basis of an appearance frequency of the keyword in a time interval, which is a period T1 backward from the time of creation, exceeding a first threshold value and a local score on the basis of the appearance frequency of the keyword in a local area indicating a range of a specific topic exceeding a second threshold value as a local hot word, and also extract the extracted time interval of the extracted keyword and the keyword of interest corresponding to the keyword; and a local hot word storing unit configured to store the extracted local hot word, the time interval, and the keyword of interest.

According to embodiments, an information extracting client configured to be capable of performing communication with an information extracting server having a local hot word storing unit in which a local hot word as a keyword within a local area indicating a range of a specific topic within a specific time interval, comprising: an input unit configured to accept a user text created by a user; a user keyword extracting unit configured to extract a user keyword included in the user text and a time of creation by the user of the user text; an identifying unit configured so as to specify the information of interest corresponding to the local hot word as the information of interest corresponding to the user text when the user keyword and the local hot word stored in the local hot word storing unit of the information extracting server match and the time of creation by the user is included in the time interval of the local hot word; and an annotating unit configured to annotate the user text with the information of interest.

Referring now to the drawings, an information extracting system 1 of an embodiment will be described below. The information extracting system 1 is a system configured to realize a Network Communication, and includes an information extracting server (hereinafter, referred to simply as "server") 3, and a plurality of information extracting clients (hereinafter, referred to simply as "clients") 2.

The clients 2 are mobile terminals that users use, and are configured to perform communication by using a network such as an Internet 4 or the like, and transmit texts created by users to the server 3 as mails and comments.

The server 3 is a server that operates Network Communication, and is configured to perform communication with the server 3 via a network such as the Internet 4 and receives the mails and the comments created by the users from the clients 2.

First of all, words used in this specification will be defined.

The term "Network Communication" includes, for example, SNS (Social Networking Service), Twitter, mixi, and facebook.

The term "keyword" means nouns such as names of places, names of people, and names of events.

The term "hot word" is also referred to as "trend word", and means keywords which are entered many times by a plurality of users during a specific time interval (for example, keywords entered by a certain number of times or more), or keywords entered by a plurality of users (for example, keywords entered by a certain number of times or more) in a specific local area.

The term "local area" means specific topical ranges, further specifically, topical ranges or fields about which the users enter, which are exemplified by "areas", "genres", and "schools". The "local area" may be set in advance.

The term "local hot word" means keywords entered within a specific local area and within a specific time interval and, further specifically, keywords entered many times by a plurality of users within a specific local area and within a specific time interval (hereinafter, referred to simply as "local word").

The term "keyword of interest" means keywords of interest to the users, and is also referred to as "information of interest" including, for example, "location keyword" and "TV program keyword".

The term "location keyword" means keywords relating to locations, indicates location information, and includes keywords such as names which help to specify the locations including existent names of places such as "Kawasaki" or "Hamamatsu-cho", or landmarks such as "Shibuya Station" or "Tokyo Tower". A further description will be given in Embodiments 1 to 3.

The term "TV program keyword" means keywords relating to TV programs broadcasted by broadcast stations and, in the case of dramas, for example, performers and names of characters are included. A further description will be given in Embodiment 4.

Embodiment 1

Referring now to FIG. 1 to FIG. 9, the information extracting system 1 according to Embodiment 1 will be described. In Embodiment 1, a matter of interest to a user is "location".

A configuration of the information extracting system 1 will be described with reference to FIG. 1. FIG. 1 illustrates a block diagram of the information extracting system 1.

The information extracting system 1 includes the server 3 and the plurality of clients 2. The clients 2 are mobile terminals which allow character input, such as mobile phones, smart phones, or tablet PCs, and are capable of transmitting text to the server 3 as mails or comments. The server 3 is capable of receiving texts from the users by using the mails and the comments from the plurality of clients 2, collects texts in which the location keyword appears, and extracts a local word from the texts.

The clients 2 each include an input unit 11, a user keyword extracting unit 12, an identifying unit 13, an annotating unit 14, and a user storing unit 15.

The input unit 11 accepts a text created by the user (hereinafter, referred to as a "user text").

The user keyword extracting unit 12 extracts a keyword from the user text (hereinafter, referred to as a "user keyword") and a time when the user text is crated. The time when the user text is created may be a time when the user enters the user text.

The identifying unit 13 specifies the location information on the basis of the local word and the user keyword extracted in the server 3.

The annotating unit 14 annotates the user text with the specified location information.

The user storing unit 15 is a database configured to store the accepted user text and the location information with which the user text is annotated in one-to-one correspondence.

The server 3 includes a collecting unit 21, a text storing unit 22, a keyword extracting unit 23, a local hot word extracting unit 24, a local hot word storing unit 25, and a category storing unit 26.

The collecting unit 21 collects texts in which the location keywords appear from Web side or the like on the Internet 4.

The text storing unit 22 is a database configured to store the collected texts from one item of location information to another.

The keyword extracting unit 23 extracts the keywords and times when the texts are crated from the stored texts.

The local hot word extracting unit 24 extracts the local words from the keywords.

The local hot word storing unit 25 is a database configured to store the extracted local words from one time interval to another, and from one item of location information (location keyword) to another.

The category storing unit 26 is a database in which items of location information (location keywords) to be extracted and category classes which the location keywords belong to are defined.

Data in the information extracting system 1 will be described with reference to FIG. 2 to FIG. 7.

As illustrated in FIG. 2, the data stored in the text storing unit 22 includes texts collected by the collecting unit 21, times when the collected texts are created, and items of location information (location keywords) included in the collected texts. The location information corresponds to any one of items of location information stored in the category storing unit 26. For example, when a collected text is "The Beatles poster at Shibuya Station is good", the time of creation is "Dec. 11, 2011, 10:00, and the location information is "Shibuya Station".

As illustrated in FIG. 4, the data stored in the local hot word storing unit 25 includes the local words, the time intervals, and the location information (the location keyword). The location information corresponds to any one of the items of location information stored in the category storing unit 26. For example, the local word is "The Beatles poster", the time interval is "Dec. 11, 2011, 00:00 to 23:59, the location information is "Shibuya Station", and also the local word is "traffic signal breakdown", the time interval is "Dec. 12, 2011, 00:00 to 23:59", and the location information is "Shibuya Station".

As illustrated in FIG. 5, the data stored in the category storing unit 26 includes the category and the location information, and categories which the respective items of location information belong. The local word is calculated or the basis of the location information as a basic unit. In an example illustrated in FIG. 5, the location keyword (location information) includes names of stations, and the category includes names of railroad lines including the names of the stations. The category is a unit in which results of local words calculated by the unit of location information are gathered. It is also possible to define a higher category (parent category) for the respective categories and define parent-child relationships between the categories. For example, it is also possible to define "East Area Railroad Company" as a parent category of "East Loop Line" and define "West Area Railroad Company" as a parent category of "West Loop Line". In this case, the local words calculated from one item of location information to another which represents the name of the station may be tallied for each category (name of railroad line) corresponding to the location information and then tallied for each parent category (for example, railroad company).

The category may be provided with an attribute. The attribute is additional information which characterizes the category. For example, in the category illustrated in FIG. 5, an area where East Loop Line gives service may be specified by a square, and latitude and longitude at four corners may be provided as an attribute of the category "East Loop Line". Also, in the example of the parent-child relationships among the categories described above, an area where East Area Railroad Company gives service may be specified by a square in the same manner, and latitude and longitude at four corners may be provided as an attribute of the category "East Area Railroad Company". These attributes are used as keys for disambiguation, that is, determination of items of location information having the same name when extracting location information keywords from the user texts. For example, "Kobe Stations" exist now in Hyogo Prefecture, Gunma Prefecture, and Ehime Prefecture. Here, a user text in which "Kobe Station" appears will be considered. If a name of another station: appears in the same user text, the location information and the category of the category storing unit 26 is referred to, and which "Kobe Station" it means is determined with the latitude and longitude of the category used as a key. For example, if "Kobe Station" and "Hyogo Station" appear in the same user text, it is determined that a railroad line "Sanyo Honsen" including the "Hyogo Station" is mentioned, and the "Kobe Station" in the user text is determined to be the "Kobe Station" existing in Hyogo Prefecture.

As illustrated in FIG. 6, the data stored in the user storing unit 15 is composed of the user text, the time of creation, and location information. For example, when the user text is "The Beatles poster is good", the time of creation is "Dec. 11, 2011, 13:00, and the location information is "Shibuya Station". However, the user keyword extracting unit 12 extracts only the user text and the time of creation, and the annotating unit 14 annotates the user text with the location information "Shibuya Station" later.

Each of the user data is annotated with the location: information as Meta data in the UI (User Interface) displayed on a display device of the client 2. For example, as illustrated in FIG. 7, the user texts are arranged one by one in the reverse temporal sequence and the location information with which each of the user texts is annotated is displayed after the sign "#".

Figure 8:
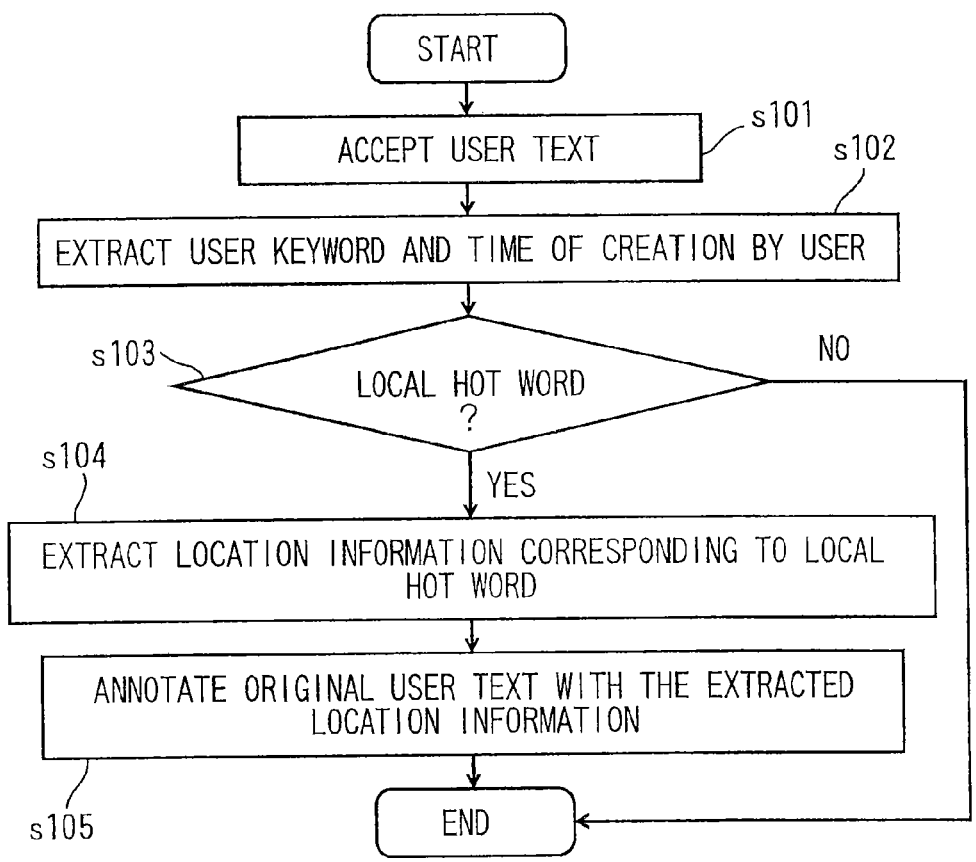
FIG. 8 is a flowchart of the client.
Figure 9:
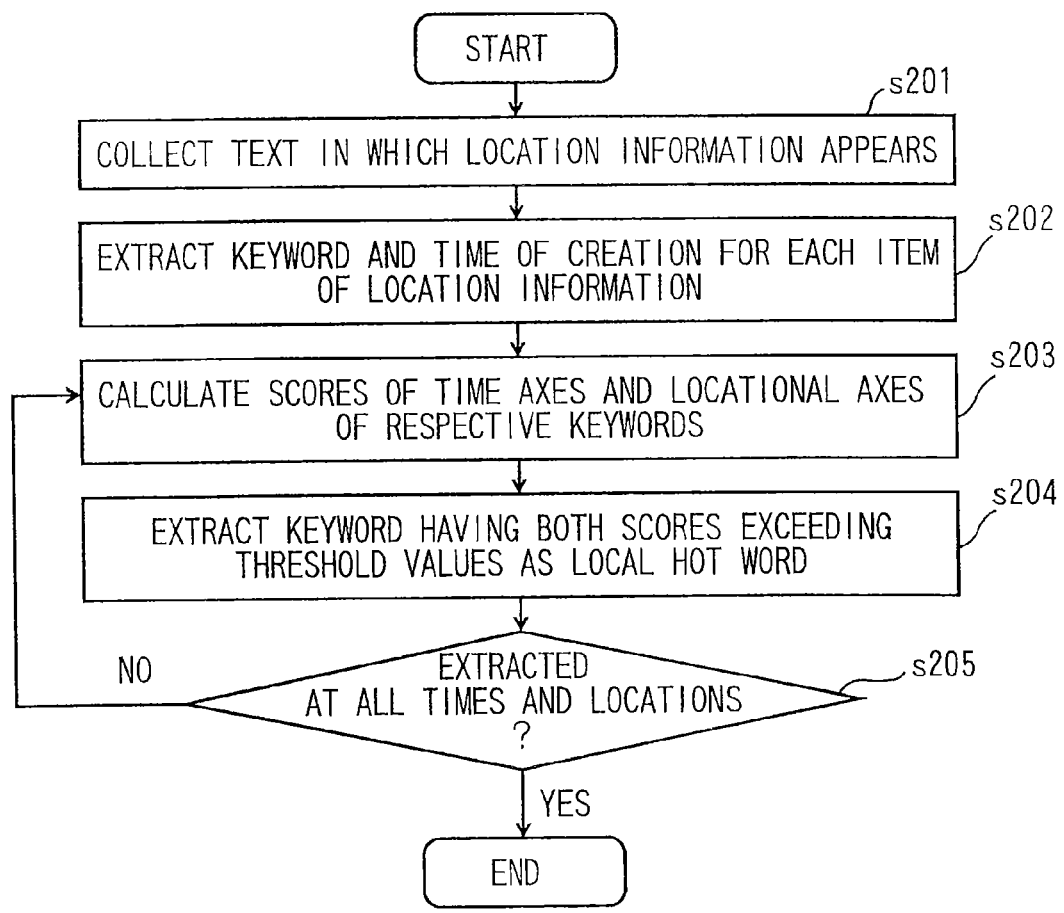
FIG. 9 is a flowchart of a server.

The process of the information extracting system 1 will be described on the basis of the flowcharts in FIG. 8 and FIG. 9.

In the information extracting system 1, the server 3 collects the texts and extracts the local words and the items of the location information from the collected texts in advance and, on the basis of the extracted local word and the location information, the client 2 annotates the user text with the location information.

The process of the server 3 will be described with reference to FIG. 9. The process of the server 3 described below may be performed for every certain period (for example, every 10 minutes) or may be performed in real time.

In Step s201, the collecting unit 21 of the server 3 collects the texts in which the location keyword appears, and stores the collected text in the text storing unit 22. The source of collection is, for example, the Internet 4, and may be a private information source such as the intranet in the company. The collected texts are stored as illustrated in FIG. 2 together with the time of creation from one item of location information to another. As the location information, for example, a set such as "stations where trains of East Loop Line stop" is determined in advance. The location information corresponds to the items of "location information" stored in the category storing unit 26. For example, when a collected text is "The Beatles poster at Shibuya Station is good", the time of creation is "Dec. 11, 2011, 10:00, and the location information is "Shibuya station".

In Step s202, the keyword extracting unit 23 extracts the keyword, the location information, and a time of creation when the text is crated from the collected text. Here, the "location information" corresponds to the items of location information stored in the category storing unit 26. At this time, the keyword extracting unit 23 extracts the keywords except for the location keyword which is an object to be collected in Step s201. A plurality of keywords may be extracted. When the collected text is "The Beatles poster at Shibuya Station is good", "The Beatles poster" is collected as a keyword. The location keyword itself is location information, and does not work as a hot word.

Figure 3:
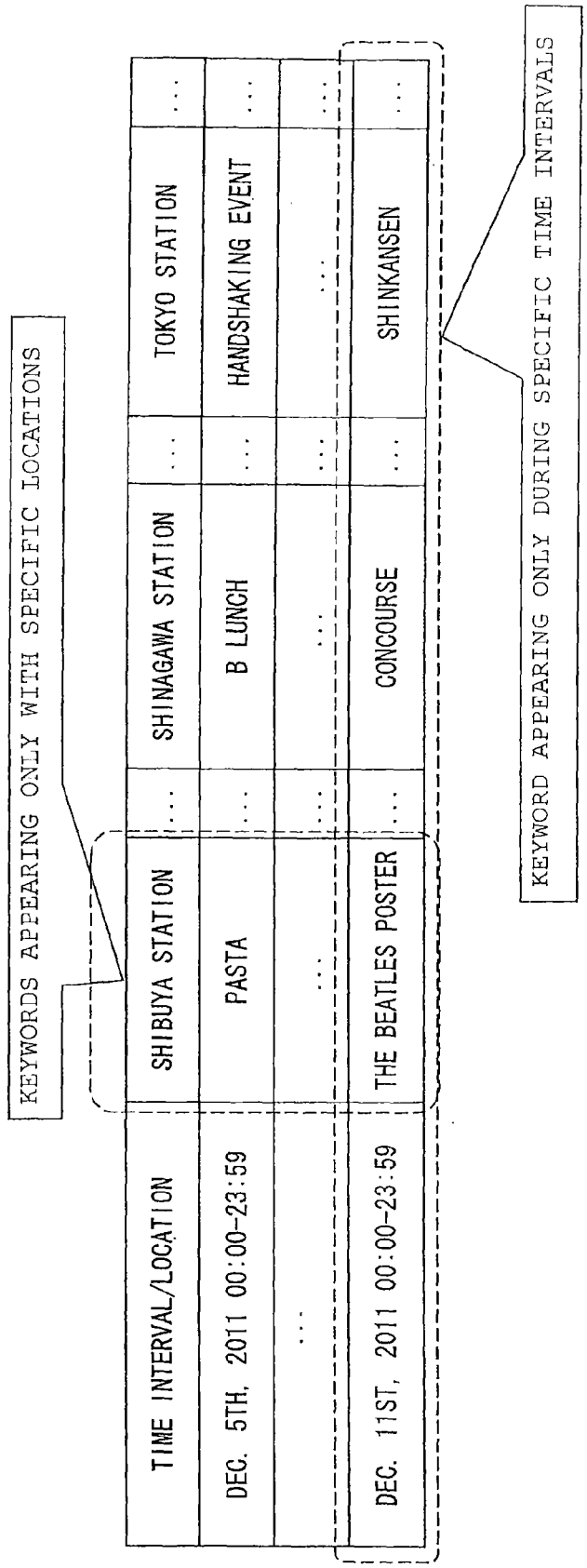
FIG. 3 illustrates an example of extraction of local words.

In Step s203, the local hot word extracting unit 24 extracts keywords whose hot word scores of a temporal axis (hereinafter referred to simply as "score") exceeds a threshold value and whose scores of a location axis exceeds a threshold value with respect to keywords extracted by the keyword extracting unit 23 as local words, and also extracts the time intervals and the items of location information thereof as illustrated in FIG. 3. At this time, the "location information" corresponds to the items of location information stored in the category storing unit 26, a period of 24 hours backward from the time of creation is set as the "appearance time". For example, when the time of creation is Dec. 5, 2011, 23:59, the time interval is "Dec. 5, 2011, 00:00 to Dec. 5, 2011, 23:59".

Specifically, the local hot word extracting unit 24 calculates scores of the respective items of location information stored in the category storing unit 26 by using Expression (1) and Expression (2). The scores include a time store TS and a local score LS. The time score TS represents the degree of variations of appearance frequency of the keyword along the temporal axis expressed in a numerical value, and the local score LS represents the degree of variations of appearance frequency of the keyword along the location axis expressed in a numerical value.

Expression (1) given below indicates a method of calculating the time score TS.

$$TS = (Tf\_tgt(KW)/Tf\_tgt(ALL))/(Tf\_ref(KW)/Tf\_ref(ALL)) \qquad (1)$$

The local hot word extracting unit 24 detects keywords appearing disproportionately in the time interval (a period of 24 hours backward from the time of creation) in a period of one week backward from the time of creation from the keywords extracted by the keyword extracting unit 23 as illustrated in Expression (1).

Tf_tgt(KW) is the number of texts (appearance frequency) in which a specific location keyword (for example "Shibuya Station") and a keyword KW (for example, "The Beatles poster") appear simultaneously in all the texts during the time interval. The expression "appears simultaneously" has the same meaning as "co-occurrence".

Tf_tgt(ALL) is the number of texts (appearance frequency) in which a specific location keyword (for example "Shibuya Station") appears in all the texts during the time interval.

Tf_ref(KW) is the number of texts (appearance frequency) in which a specific location keyword (for example "Shibuya Station") and the keyword KW (for example, "The Beatles poster") appear simultaneously in all the texts corresponding to a period of one week backward from the time of creation.

Tf_ref(ALL) is the number of texts (appearance frequency) in which a specific location keyword (for example "Shibuya Station") appears in all the texts in the period of one week backward from the time of creation.

Expression (2) given below indicates a method of calculating the local score LS.

$$LS=(Lf\_tgt(KW)/Lf\_tgt(ALL))/(Lf\_ref(KW)/Lf\_ref(ALL)) \quad (2)$$

The local hot word extracting unit 24 detects keywords which have tight relation with the specific location information from among keywords stored in the category storing unit 26 and appearing in association with all the items of location relationship from the keywords extracted by the keyword extracting unit 23 as illustrated in Expression (2).

Lf_tgt(KW) is the number of texts (appearance frequency) in which a specific location keyword (for example "Shibuya Station") and the keyword KW (for example, "The Beatles poster") appear simultaneously in all the texts during the time interval.

Lf_tgt(ALL) is the number of texts (appearance frequency) in which a specific location keyword (for example, "Shibuya Station") appears in all the texts during the time interval.

Lf_ref(KW) is the number of texts (appearance frequency) in which all the location keywords (for example, all the stations in the capital region) in the preset local area (area, for example, capital region) and the keyword KW (for example, "The Beatles poster") appear simultaneously in all the texts during the time interval. In other words, as described above, the local hot words mean keywords entered a number of times within a specific time interval and this local area (for example, the capital region).

Lf_ref(ALL) is the number of texts (appearance frequency) in which all the location keywords (for example, all the stations in the capital region) in the local area (for example, capital region) appear in all the texts during the time interval.

In this manner, the local hot word extracting unit 24 calculates the time score and the local score respectively by using Expression (1) and Expression (2) for each of the keywords KW.

In the description given above, the calculation is performed on the basis of the number of texts (the appearance frequency). However, any method may be applied as long as the score can be calculated.

Setting of the period of 24 hours backward from the time of creation (appearance time, the time of Tf_tgt) or the period of one week backward from the time of creation (the time of Tf_ref) may be changed in accordance with the field of application of Embodiment 1 (for example, railway information or TV program information). In this case, the change is to be performed under the condition of the time of Tf_tgt<the time of Tf_ref.

In Step s204, the local hot word extracting unit 24 extracts keywords whose time score TS and the local score LS both exceed a first threshold value Rtime and a second threshold value Rlocal respectively thereof as local words as shown by Expression (3) and Expression (4) given below. The first threshold value Rtime and the second threshold value Rlocal are set in advance.

$$TS > Rtime \quad (3)$$

$$LS > Rlocal \quad (4)$$

In Step s205, the local hot word extracting unit 24 determines whether or not the local words are extracted at all the times and with all the locations regarding the keyword extracted by the keyword extracting unit 23.

The local hot word extracting unit 24 ends the process when all the local words are extracted. The extracted local words are each stored in the local hot word storing unit 25 as one record tied up with the location information together with the time interval during which the extracted local wore is effective as illustrated in FIG. 4.

In contrast, when the local hot word extracting unit 24 does not extract all the local words, the procedure goes back to s203, where the score is calculated again.

When the parent-child relationship is defined among the categories in the data to be stored in the category storing unit 26, the local hot word extracting unit 24 may refer to the results of calculation by Expression (1) and Expression (2) for each of the railroad lines and the definition of the parent-child relationship and tally by the unit of a large category (for example, the railroad company). Accordingly, the local hot word extracting unit 24 is capable of extracting the hot word for each of the large categories (for example, the railroad company).

Subsequently, the process to be performed by the client 2 will be explained on the basis of FIG. 8.

In Step s101, the input unit 11 of the client 2 accepts a user text created by the user. For example, the input unit 11 accepts "The Beatles poster is vigorous" as the user text. The accepting time corresponds to a time of creation by the user. This method of acceptance does not necessarily have to be a text entry, and may be, for example, a voice entry audio-typed into a text document by phonetic recognition.

In Step s102, the user keyword extracting unit 12 extracts the user keyword and the time of creation by the user corresponding thereto from the user text. This method of extraction is performed in the same method as the keyword extraction of the keyword extracting unit 23 of the server 3, and a plurality of keywords may be extracted. The user keyword extracting unit 12 extracts "The Beatles poster" as the user keyword, and extracts "Dec. 11, 2011, 13:00" as the time of creation by the user.

In Step s103, the identifying unit 13 determines whether or not the extracted user keyword is a local word.

A detailed method of determination will be described.

First of all, the identifying unit 13 performs communication with the local hot word storing unit 25 of the server 3, and specifies a local word matching the extracted user keyword and whose time interval includes the time of creation of the user text. When a user keyword is "The Beatles poster", and the time of creation by the user is "Dec. 11, 2011, 13:00", since the user keyword matches the "The Beatles poster" of the local word, and the time of creation by the user is included in the time interval, the identifying unit 13 determines that the "The Beatles poster" is a local word as illustrated in FIG. 4.

In Step s104, when the extracted user keyword is a local word, the identifying unit 13 acquires the location information corresponding to the local word from the local hot word storing unit 25. For example, the identifying unit 13 determines that the "The Beatles poster" is a local word, and hence acquires the location information "Shibuya Station".

In contrast, when the extracted keyword is not the local word, the identifying unit 13 terminates the process. In this case, the user text is not annotated with the location information.

In Step s105, the annotating unit 14 annotates the original user text with the extracted location information and stores the same in the user storing unit 15 as illustrated in FIG. 6. For example, the annotating unit 14 annotates the user text with the location information "Shibuya Station" to the "The Beatles poster is vigorous".

The annotating unit 14 may display the stored location information as Meta data in the UI of the client 2 together with the original user text. For example, as illustrated in FIG. 7, the user texts are arranged one by one in the reverse temporal sequence and the location information with which the user texts are annotated is displayed after the sign "#". In this case, the annotating unit 14 displays "The Beatles poster is vigorous. #ShibuyaStation".

According to Embodiment 1, the location of the client 2 which accepts the user text is grasped without GPS positioning information. Accordingly, a location information service such as information distribution tightly corresponding to circumstances of the user may be realized.

In addition, the user can search or sort out the text by using keyword of interest on the client (mobile terminal) 2.

In the server 3 configured to receive and transmit the text, since the location keyword is specified, the text can be controlled and sorted out on the basis of the location keyword.

As a modification of Embodiment 1, location information estimated from the user text is "capital area broadcasting". At this time, the broadcasting area of a broadcast station in which the location where the user watches the TV is included may be considered as a virtual location.

Embodiment 2

Figure 10:
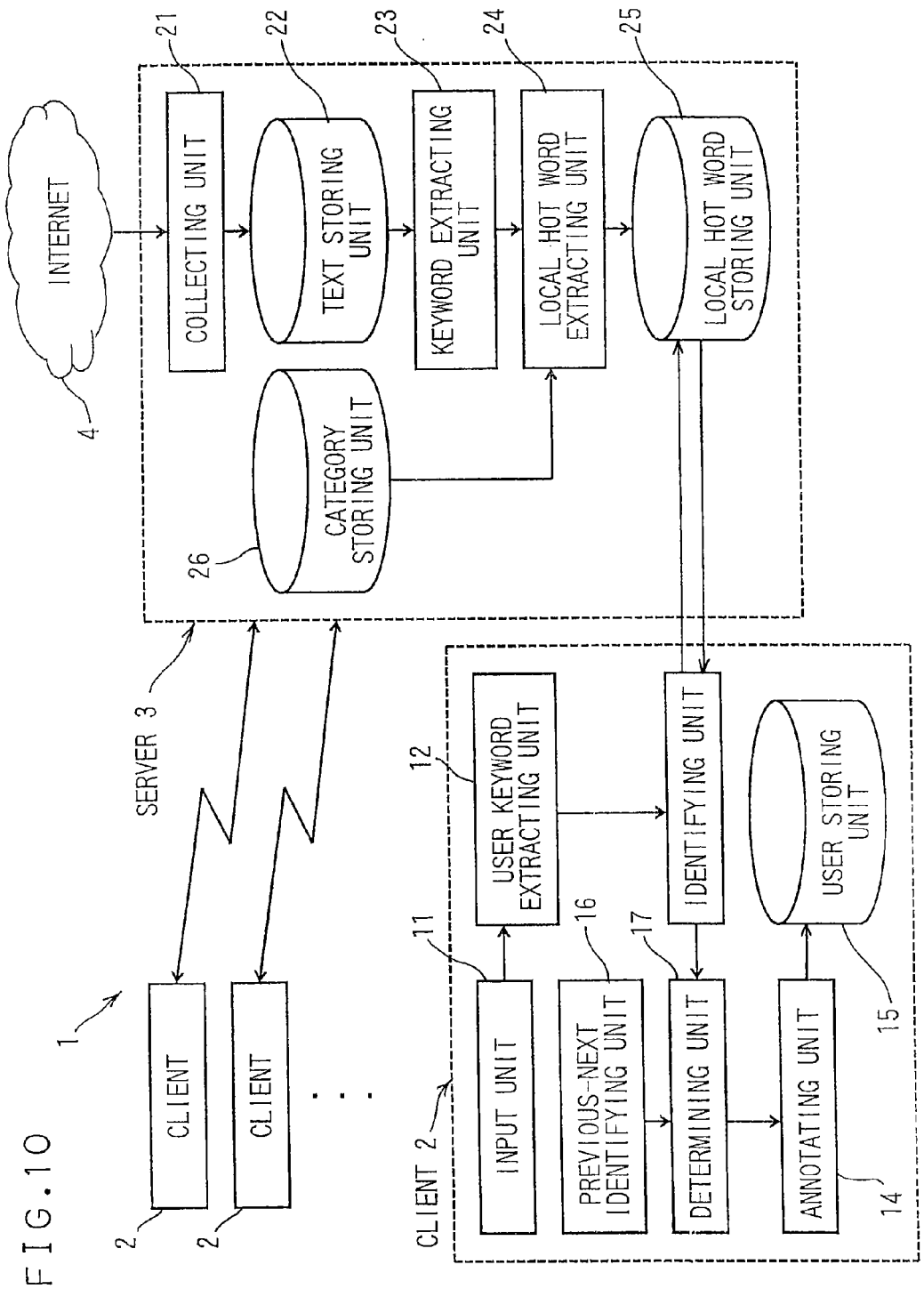
FIG. 10 is a block diagram of an information extracting system of Embodiment 2.
Figure 11:
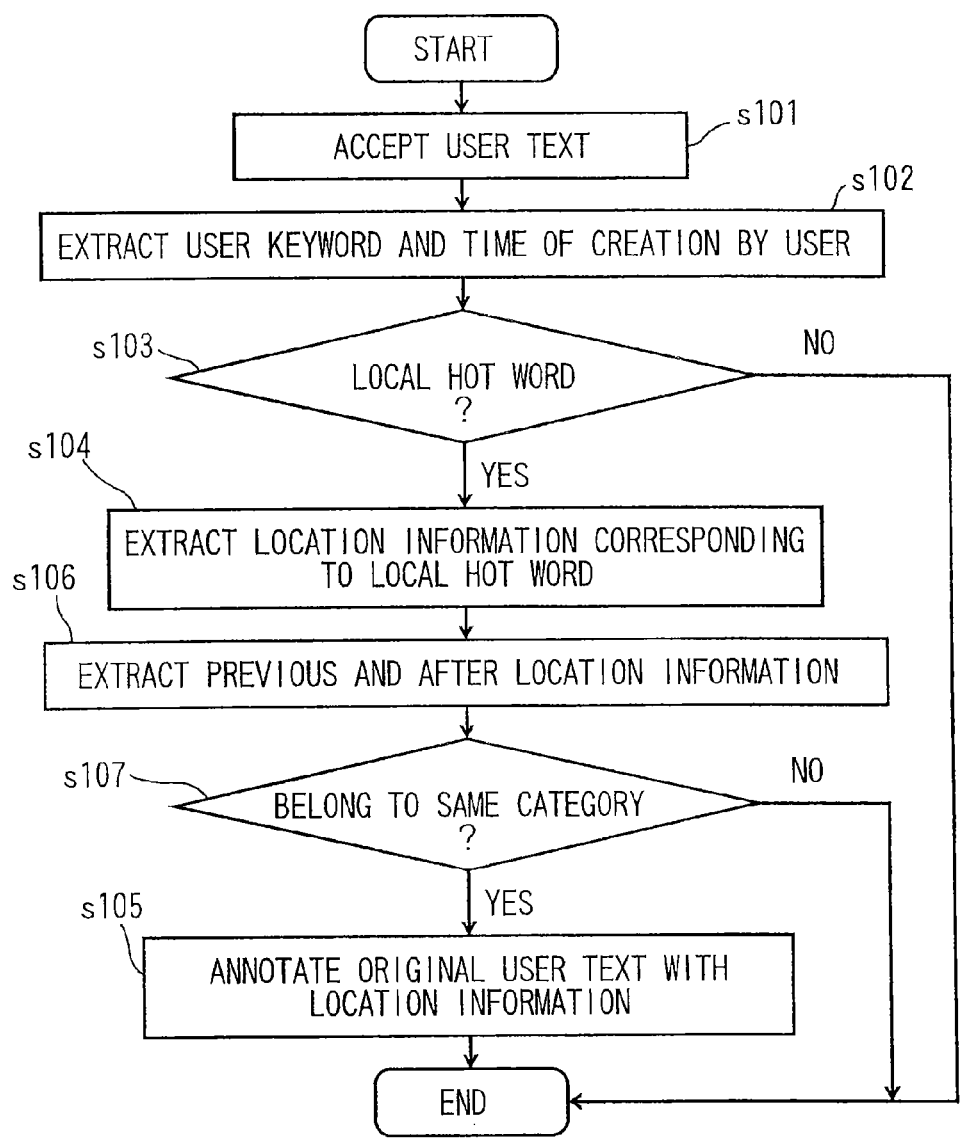
FIG. 11 is a flowchart of the client.

Referring now to FIG. 10 and FIG. 11, the information extracting system 1 according to Embodiment 2 will be described. FIG. 10 is a block diagram of the information extracting system 1, and FIG. 11 is a flowchart illustrating the process of the client 2.

The configuration and the process of the server 3 of Embodiment 2 is the same as those of Embodiment 1, and hence the description is omitted.

The client 2 further includes the previous-next identifying unit 16 and a determining unit 17 in addition to the configuration of the client 2 of Embodiment 1, and, as processes, Step s106 for extracting the items of previous and next location information of the previous and next the user texts and Step s107 for determining whether or not the previous and next location information belongs to the same category of the original location information are added.

In Embodiment 1, even though the user text includes the local word, the user is not necessarily with the location corresponding to the local word. Therefore, the client 2 of Embodiment 2 performs a process illustrated in a flowchart in FIG. 11.

In Steps s101 to s104, the client 2 performs the same process as Embodiment 1, and obtains the location information for the user text which is wanted to be annotated with the location information (hereinafter, referred to as an original user text), and the procedure goes to Step s106.

In Step s106, the previous-next identifying unit 16 performs the same procedures as in Steps s101 to s104 on the user text created previously and next to the original user text, and extracts the previous and next location information, and the procedure goes to Step s107. The range of the time of creation by the user of the previous and next user texts are determined in advance, for example, previous and next 30 minutes of the time of creation by the user of the original user text.

In Step s107, if the original location information determined from the original user text and the previous and next location information determined from the previous and next user text belong to the same category, the determining unit 17 determines that the user is likely to be with the location: indicated by the original location information and, the procedure goes to Step s105 (if Yes), and the procedure is terminated if the location information is not belong to the same category (if No).

In Step s105, the annotating unit 14 annotates the original user text with the original location information and the procedure is terminated.

For example, it is assumed that the location information determined from the user text is "Shibuya Station". If the previous and next location information (for example, previous or next 30 minutes) determined from the previous and next user texts is "Shinagawa Station", "Shibuya Station" and "Shinagawa Station" are stations of East Loop Line and belong to the same category. Therefore, the user is likely to be at "Shibuya Station", and hence the determining unit 17 annotates the user text with the location information as "Shibuya Station" (see FIG. 7).

In contrast, if the previous and next location information (for example, previous or nest 30 minutes) is "Osaka Station", "Shibuya Station" and "Osaka Station" do not belong to the same category. Therefore, the user is not likely to be at "Shibuya Station", and hence the annotating unit 14 does not annotate the user text with the location information as "Shibuya Station".

The previous and next location information may be estimated from a sensor of the GPS or the like. In such a case, for example, the location information acquired from the GPS immediately before or immediately after is considered as the previous and next location information.

As a modification of Embodiment 2, location information estimated from the user text is "capital area broadcasting". When considering the location where the user watches the TV, the broadcasting area of a broadcast station may be considered as a virtual location. If the previous and next location information estimated from the previous and next user text is "Tokyo Bay Broadcasting", the "Capital Area Broadcasting" and "Tokyo Bay Broadcasting" can be watched in the same category (broadcasting area=location). Therefore, since the user is likely to be at the broadcasting area of the "Capital Area Broadcasting", the previous-next identifying unit 16 provides the user text with location information of "Capital Area Broadcasting". In contrast, if the previous and next location information is "Hyogo Area Broadcasting", the "Capital Area Broadcasting" and "Hyogo Area Broadcasting" cannot be watched in the same category (broadcasting area=location). Therefore, the user is not likely to be at the "Capital Area Broadcasting", the previous-next identifying unit 16 does not provide the user text with location information as "Capital Area Broadcasting".

Embodiment 3

Figure 12:
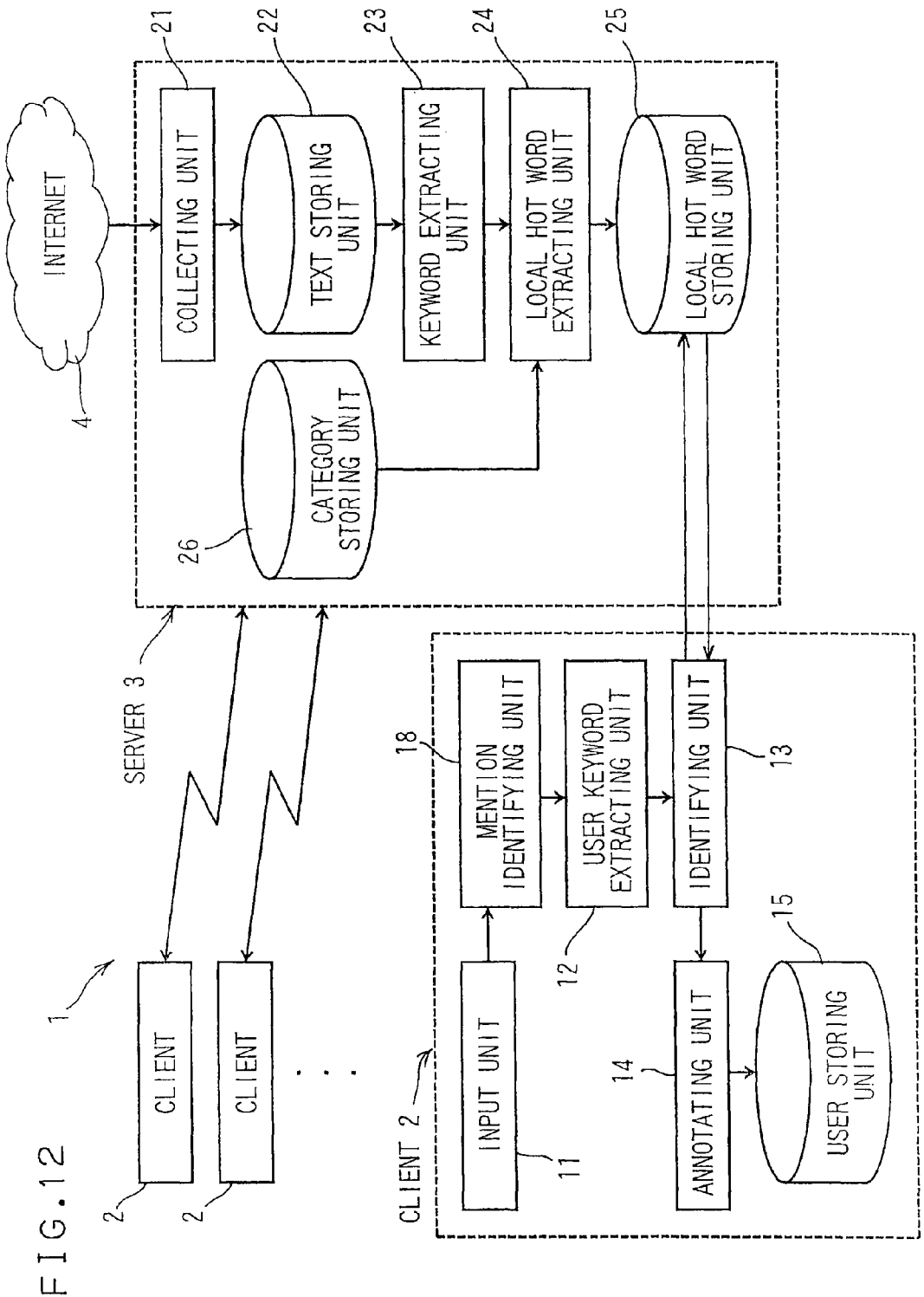
FIG. 12 is a block diagram of an information extracting system of Embodiment 3.
Figure 13:
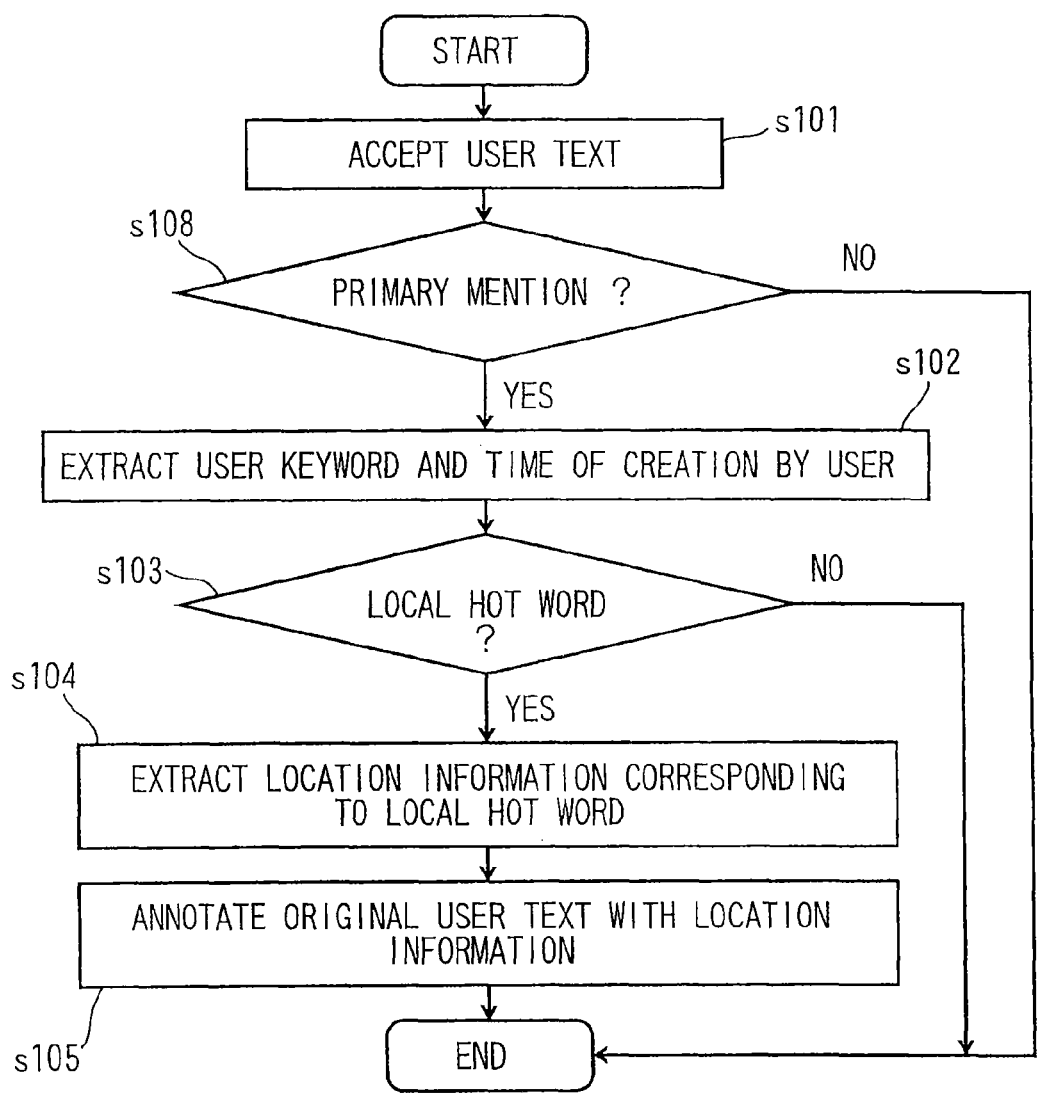
FIG. 13 is a flowchart of the client.

Referring now to FIG. 12 and FIG. 13, the information extracting system 1 according to Embodiment 3 will be described. FIG. 12 is a block diagram of the information extracting system 1, and FIG. 13 is a flowchart illustrating the process of the client 2.

The configuration and the process of the server 3 of Embodiment 3 is the same as those of Embodiment 1, and hence the description is omitted.

The client 2 further includes a mention identifying unit 18 in addition to the configuration of the client 2 of Embodiment 1, and Step s108 for determining whether or not it is a primary mention is added as a process. The term "primary mention" is a first mention that the user sends out relating to a certain topic or a case.

As described in Embodiment 2, even though the user text includes the local word, the user is not necessarily with the location corresponding to the local word. In Embodiment 3, the above-described problem is solved from a different point of view from Embodiment 2.

In Embodiment 3, when the user text is the primary mention, the user text is provided with location information. If it is the primary mention, it can be determined that the user is likely to be with the location corresponding to the location information. In general, when the location keyword is included in a secondary mention, the user as the secondary speaker is not with the corresponding location and, in many cases, it is an opinion or an impression on the primary mention.

Therefore, the mention identifying unit 18 determines the mention by analyzing the document structure of the user text itself. Specifically, the mention identifying unit 18 determines the mention not to be the primary mention if the user text quotes another user text or is a response to another user, and to be the primary mention in other cases.

For example, in the case of "Where did you see this The Beatles poster? RT:@taro The Beatles poster is good." in Twitter, the sentence before RT corresponds to the secondary mention and the sentence after RT corresponds to the primary mention. In other words, since another user text is quoted, the mention identifying unit 18 determines that the mention is not the primary mention.

In the case of "@taro I would like to see the The Beatles poster.", an expression "@<user name>" which indicates the user name who receives the response is included at the top of the mention. In other words, since the mention is response to another user, the mention identifying unit 18 determines that the mention is not the primary mention.

In contrast, if the mention is "The Beatles poster is good.", since there is no "RT" included in the mention. Therefore, there is neither the quote of another user text nor "@<user name>" which indicates the response is not included therein, it is not a response to another user. Accordingly, the mention identifying unit 18 determines that the mention is the primary mention and annotates the original user text with the location information.

The content described in Embodiment 3 is not the determination of the credibility about the content which is indicated by the primary information, but only the extraction of the mention being likely to be stated with a location indicated by the location information by using the document structure of the text.

The user text determined to be the primary mention, the client 2 performs the steps from Step s102 onward to calculate the local word in the same manner as Embodiment 1. In contrast, the user text determined not to be the primary mention, the user keyword extracting unit 12 does not perform the calculation of the local word, and terminates the processes from then onward.

With the configuration described above, Embodiment 3 includes a filtering condition that determines whether or not the mention is the primary mention added thereto as preprocessing of Embodiment 1.

Embodiment 4

Referring now to FIG. 14, the information extracting system 1 according to Embodiment 4 will be described.

The configurations and the processes of the client 2 and the server 3 of Embodiment 4 are the same as those of Embodiment 1. Embodiments 1 to 3 have described the location keyword as the keyword of interest (information of interest). However, in Embodiment 4, the description will be given with a TV program name as the information of interest, and a case where the keyword of interest is a TV program keyword will be described with reference to FIG. 14.

In an example illustrated in FIG. 14, the TV program keyword (information of interest) is a TV program name which is broadcasted in Tokyo in a certain day at a certain time, and the category is the name of broadcast station that broadcasts the TV program. The process of the information extracting system 1 will be described below.

First of all, the collecting unit 21 of the server 3 collects texts in which the TV program keyword appears from the Internet 4 or the like and the collected texts are stored in the text storing unit 22 for each item of TV program information.

The keyword extracting unit 23 extracts a keyword other than the TV program keyword from the stored text and a time when the text is crated.

The category storing unit 26 stores the TV program information items (TV program keywords) to be extracted and category classes which the TV program keywords belong to.

The local hot word extracting unit 24 extracts the keyword having the time score and the TV program score exceeding respective threshold values from the keywords as a local keyword as in Embodiment 1. The time in Expression (1) corresponds to a preset time interval and the local area in Expression (2) corresponds to the genre of the TV program (for example, news, drama, popular music program, and variety).

The local hot word storing unit 25 stores the extracted local words for each time interval and each TV program.

Subsequently, the user enters a user text by using the client 2 as a mobile terminal while watching a certain program on the TV. For example, the input unit 11 accepts the mention "Talent J is cool".

The user keyword extracting unit 12 extracts the "Talent J" as a user keyword, and extracts also the time of creation of the user text.

The identifying unit 13 specifies TV program information from the user keyword on the basis of the local words and the time intervals extracted by the server 3 and stored in the local hot word storing unit 25.

The annotating unit 14 annotates the user text with the specified TV program information.

The user storing unit 15 stores the accepted user text and the TV program information with which the user text is annotated in one-to-one correspondence.

According to Embodiment 4, the TV program information of the user is grasped without the entry of the TV program name.

The clients 2 and the servers 3 of the information extracting systems 1 of the respective embodiments described above each include a control device such as a CPU (Central Processing Unit), a storage device such as a ROM or a RAM, and an external storage device such as a HDD or an SSD and are configured to be realized by a hardware configuration using a normal computer. The respective components described above in the respective embodiments may be realized on the basis of software or on the basis of hardware.

Modifications

Although the "location information" and the "TV program information" have been described as the information of interest in the respective embodiments described above, the invention is not limited thereto and, for example, school class information (for example, a class of economics), song information of singers, sport athlete information, movie information presented in cinemas, performance information performed in theaters, recreation facility information in parks, flight information, and car line information are also included.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An information extracting server comprising:
    a collecting unit configured to collect a text in which a keyword of interest indicating information of interest that a user is interested in appears, the keyword of interest, and a time of creation of the text;
    a keyword extracting unit configured to extract a keyword included in the text except for the keyword of interest, and the time of creation;
    a local hot word extracting unit configured to extract the keyword having a time score obtained on the basis of an appearance frequency of the keyword in a time interval, which is a period T1 backward from the time of creation, exceeding a first threshold value and a local score on the basis of the appearance frequency of the keyword in a local area indicating a range of a specific topic exceeding a second threshold value as a local hot word, and also extract the extracted time interval of the extracted keyword and the keyword of interest corresponding to the keyword; and
    a local hot word storing unit configured to store the extracted local hot word, the time interval, and the keyword of interest.

2. The information extracting server according to claim 1, wherein
    the local hot word extracting unit
    obtains a first ratio between an appearance frequency at which the keyword of interest and the keyword appear at the same time from all of the texts extracted within the time interval, and an appearance frequency at which the keyword of interest appears,
    obtains a second ratio between an appearance frequency at which the keyword of interest and the keyword appear at the same time and an appearance frequency at which the keyword of interest appears from all the texts extracted in a period T2 backward from the time of creation of the keyword (provided that T1<T2), and
    obtains the ratio between the first ratio and the second ratio as the time score.

3. The information extracting server according to claim 1, wherein the local hot word extracting unit
    obtains a third ratio between an appearance frequency at which the keyword of interest and the keyword appear at the same time from all the texts extracted within the time interval, and an appearance frequency at which the keyword of interest appears,
    obtains a fourth ratio between an appearance frequency at which all the keywords of interest included in the local area and the keyword appear at the same time from all the texts extracted within the time interval, and an appearance frequency at which all the keywords of interest included in the local area appear, and
    obtains the ratio between the third ratio and the fourth ratio as the locale score.

4. The information extracting server according to claim 1, wherein
    the keywords of interest are classified into categories and are stored in a category storing unit, and
    the local hot word extracting unit tallies the extracted local hot words for each category by using the keywords of interest and the categories stored in the category storing unit.

5. The information extracting server according to claim 1, wherein the keyword of interest is a location keyword, and
    the local area is a specific area.

6. The information extracting server according to claim 1, wherein the keyword of interest is a TV program keyword indicating a TV program name that a broadcast station broadcasts, and
    the local area is a specific genre.

7. The information extracting server according to claim 1, wherein the local hot word is a keyword within a local area indicating a range of a specific topic within a specific time interval.

8. An information extracting client configured to be capable of performing communication with an information extracting server having a local hot word storing unit in which a local hot word as a keyword within a local area indicating a range of a specific topic within a specific time interval, comprising:
    an input unit configured to accept a user text created by a user;
    a user keyword extracting unit configured to extract a user keyword included in the user text and a time of creation by the user of the user text;
    an identifying unit configured so as to specify the information of interest corresponding to the local hot word as the information of interest corresponding to the user text when the user keyword and the local hot word stored in the local hot word storing unit of the information extracting server match and the time of creation by the user is included in the time interval of the local hot word; and
    an annotating unit configured to annotate the user text with the information of interest.

9. The information extracting client according to claim 8, further comprising:
    a previous-next identifying unit configured to specify the information of interest of the previous and next user text created previously and next to the time of creation by the user of the original user text that is to be annotated with the information of interest; and
    a determining unit configured to determine whether or not the information of interest of the original user text and the previous and next information of interest belong to the same category, wherein
    the annotating unit annotates the original user text with the information of interest when the information of interest of the original user text and the previous and next information of interest are determined to belong to the same category.

10. The information extracting client according to claim 8, further comprising:
    a mention identifying unit configured to determine whether or not the user text is a primary mention, wherein
    the annotating unit annotates the user text with the information of interest when the user text is determined to be the primary mention.

11. An information extracting method comprising:
    collecting a text in which a keyword of interest indicating information of interest that a user is interested in, the keyword of interest, and a time of creation of the text;

extracting a keyword included in the text except for the keyword of interest and configured to extract the time of creation;

extracting the keyword having a time score obtained on the basis of an appearance frequency of the keyword in a time interval, which is a period T1 backward from the time of creation, exceeding a first threshold value and a local score on the basis of the appearance frequency of the keyword in a local area indicating a range of a specific topic exceeding a second threshold value as a local hot word, and also extract the extracted time interval of the keyword and the keyword of interest corresponding to the keyword; and storing the extracted local hot word, the time interval, and the keyword of interest.

12. The information extracting method according to claim 11, further comprising:

accepting a user text created by the user;

extracting a user keyword included in the user text and a time of creation by the user of the user text;

specifying the information of interest corresponding to the local hot word as the information of interest corresponding to the user text when the user keyword and the local hot word stored and the time of creation by the user is included in the time interval of the local hot word; and annotating the user text with the information of interest.

13. A non-transitory program stored in a computer readable medium, causing a computer to perform:

a collection function configured to collect a text in which a keyword of interest indicating information of interest that a user is interested in appears, the keyword of interest, and a time of creation of the text;

a keyword extracting function configured to extract a keyword included in the text except for the keyword of interest and configured to extract the time of creation;

a local extracting function configured to extract the keyword having a time score obtained on the basis of an appearance frequency of the keyword in a time interval, which is a period T1 backward from the time of creation, exceeding a first threshold value and a local score on the basis of the appearance frequency of the keyword in a local area indicating a range of a specific topic exceeding a second threshold value as a local hot word, and also extract the extracted time interval of the keyword and the keyword of interest corresponding to the keyword; and a local storing function configured to store the extracted local hot word, the time interval, and the keyword of interest.

14. The information extracting program according to claim 13, the program causing the computer to perform:

an accepting function configured to accept a user text created by the user;

a user keyword extracting function configured to extract a user keyword included in the user text and a time of creation by the user of the user text;

a specifying function configured to specify the information of interest corresponding to the local hot word as the information of interest corresponding to the user text when the user keyword and the local hot word stored by the local storing function match and the time of creation by the user is included in the time interval of the local hot word; and an annotating function configured to annotate the user text with the information of interest.

15. The information extracting server according to claim 2, wherein the local hot word extracting unit obtains a third ratio between an appearance frequency at which the keyword of interest and the keyword appear at the same time from all the texts extracted within the time interval, and an appearance frequency at which the keyword of interest appears, obtains a fourth ratio between an appearance frequency at which all the keywords of interest included in the local area and the keyword appear at the same time from all the texts extracted within the time interval, and an appearance frequency at which all the keywords of interest included in the local area appear, and obtains the ratio between the third ratio and the fourth ratio as the locale score.

16. The information extracting server according to claim 2, wherein the keywords of interest are classified into categories and are stored in a category storing unit, and the local hot word extracting unit tallies the extracted local hot words for each category by using the keywords of interest and the categories stored in the category storing unit.

17. The information extracting server according to claim 3, wherein the keywords of interest are classified into categories and are stored in a category storing unit, and the local hot word extracting unit tallies the extracted local hot words for each category by using the keywords of interest and the categories stored in the category storing unit.

* * * * *